A. J. REDWAY.

Fireplace.

No. 2,740. Reissued Aug. 20, 1867.

Witnesses:
Jas. H. Layman
Samuel Wright

Inventor:
A. J. Redway
By Knight Bros
Attys

United States Patent Office.

ALBERT J. REDWAY, OF CINCINNATI, OHIO.

*Letters Patent No.* 64,446, *dated May* 7, 1867; *reissue No.* 2,740, *dated August* 20, 1867.

IMPROVEMENT IN FIRE-PLACES.

The Schedule referred to in these Letters Patent and making part of the same.

TO ALL WHOM IT MAY CONCERN:

Be it known that I, ALBERT J. REDWAY, of Cincinnati, Hamilton county, Ohio, have invented certain new and useful improvements in Open Stoves and Fire-Places; and I hereby declare the following to be a full, clear, and exact description thereof, reference being had to the accompanying drawings, making part of this specification.

This invention consists in the provision of a peculiarly-shaped deflecting crown or canopy over the grate proper of an open stove or fire-place, the sides of said crown being provided with flues for the purpose of conducting the smoke, gas, and other products of combustion in two laterally-diverging streams to the upper front corners of the fire-place, and thence above said crown by two converging branches to the chimney. In the accompanying drawings—

Figure 1:
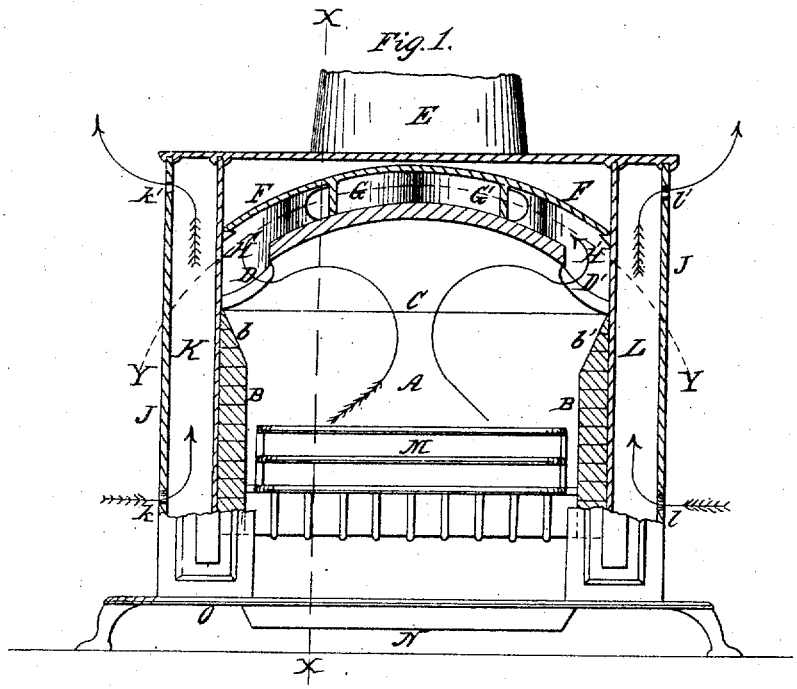
Figure 1 is a front elevation, partially in section, of an open stove embodying my improvements.
Figure 2:
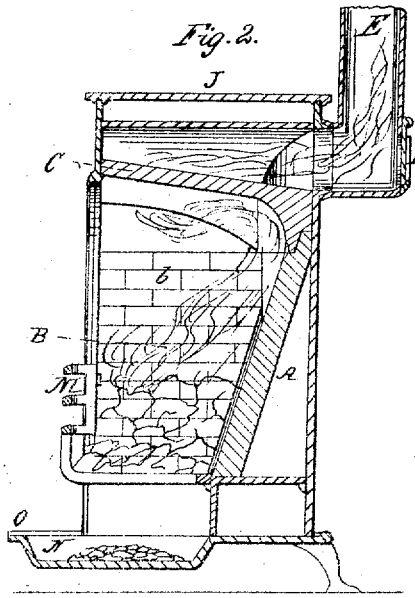
Figure 2 is a vertical cross-section, taken at the line X X.
Figure 3:
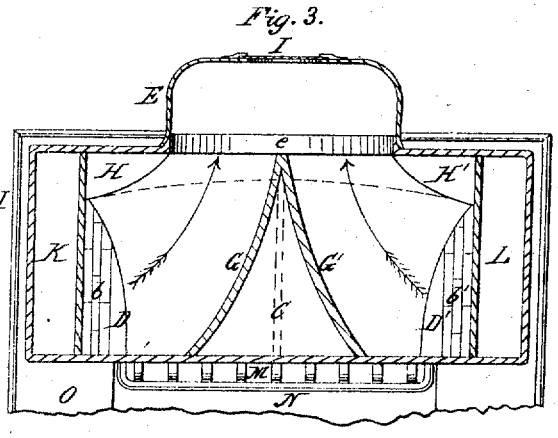
Figure 3 is a section taken at the curved line Y Y.

The fire-back A may be concave in its horizontal section, as indicated by the dotted black line in fig. 3, and this back may be formed of tile, fire-brick, cast iron, or any other suitable material. The jambs B B′ are constructed preferably of fire-brick or tile, and their upper portions *b b′* incline upward and outward from the centre of the fire-chamber, so as to allow a free exit for the smoke, &c. Placed immediately over the fire-chamber is a crown, canopy, or deflecting plate, C, of tile or cast iron, which is preferably of the slightly-arched form here illustrated, but which may be flat or of a truncated form, and that portion of the sides of this tile nearest to the front of the stove or fire-place is pierced with flues D D′, whose area is preferably greater in front than in rear. In order to conduct the smoke, &c., into the pipe E, I provide a plate, F, which should be parallel, or nearly so, to the crown-plate or tile C, and said plate F is furnished with two downwardly-projecting curved flue-strips G G′. These flue-strips are some distance apart at the front of the stove, but they converge to a point as they approach the opening *e* of the smoke pipe E, and serve, in connection with the abutments H H′, to conduct the products of combustion from the flues D D′ of the reflector into the smoke pipe E without eddies. (See red arrows in fig. 3.) A small door, I, may be provided in the smoke-pipe elbow to permit the removal of any soot, ashes, &c., which might collect on the upper surface of the crown C, and as this crown has a slight descent toward the back of the stove, it greatly facilitates the cleaning of the flues. The fire-chamber may be contained within a shell or case, J, either of cast or sheet iron, and this case may be provided with chambers K L for heating air, the cold air entering at the apertures *k l*, and after its temperature has been raised escaping at the apertures *k′ l′*. M, N, and O represent respectively an ordinary basket, ash-pit, and hearth-plate.

The operation of the stove is clearly shown in the drawings. It will be seen that the fire and smoke which emanate from the fuel contained in the basket M ascend, and as soon as these products of combustion come in contact with the crown C they are reflected therefrom, and immediately flow in two opposite and laterally-diverging streams toward the side flues D D′, up which they are carried, and thence in the converging passages formed between the curved plate F, top of the tile C, flue-strips G G′, and abutments H H′. After leaning these passages the smoke passes into the pipe E, and thence into the chimney.

Among the many advantages resulting from the use of the deflector C D D′ and its accompanying devices the following may be enumerated: This improvement, whether applied to a stove or a grate, will effectually prevent any eddies of smoke, and will not impede the draught; and the arrangement is found remarkably free from the tendency, so common with open fire-places, to puff out smoke when a sudden gust of air enters either from the front or back. This freedom from smoking in my improvement is believed to be due to the lateral direction given to the smoke on leaving the fire. The lateral direction of draught caused by the side flues D D′ causes the entering air to take the currents in flank instead of in direct opposition, and thus avoids puffing out. This position of the flues also causes any deposition of soot to fall directly into the fire instead of out into the room, as with other stoves and fire-places of this class. No gas, smoke, or other obnoxious vapors can escape into the room, as the greater portion of them is consumed under the crown, and what little smoke, &c., may remain is carried up through the side flues D D′. The draught produced by the side flues D D′ serves to draw up the smoke and all of the light ashes which are shaken through the basket in the act of stirring or poking the fire, thus removing a great objection to the use of open stoves and grates. The channels H G H′ G′, becoming intensely heated, create and preserve a high degree of buoyancy, which, even should the fire slacken or become overloaded with fresh fuel, operates to maintain a very heavy draught. My crown can be applied to an ordinary grate, and to most of the open stoves now in use, and as my fire-chamber is not usually deep, when measured from the front bars to the back of the chamber, it will be seen that the heat from the incandescent fuel is radiated directly into the room without being obstructed by a large body of coal.

I have selected to illustrate my invention the form preferred by me as that which practical test has proved to be effective, but I do not desire to confine myself thereto so long as the same results are obtained by means substantially equivalent; for example, an inferior modification of my invention may have a single strip (see red line C *e*) in place of the curved pieces G G′, and the intermediate plates of F, K, and L may be dispensed with in some forms of stoves. This invention, although more particularly designed for open stoves and fire-places, is also applicable to such as are provided with doors, by which they may be closed at will, and for such I also claim it.

I claim herein as new, and of my invention—

1. In the described combination with an open-front stove or fire-place, I claim the crown C, whether flat, truncated, or arched, having the side flues D D′ and dividing-strip or strips G G′, substantially as set forth.

2. Surmounting the fire-chamber of a grate or stove with the arched crown C, which extends from the front to the back of the fire-chamber, and is provided with the side flues D D′, all arranged and operating in the manner herein described and set forth.

3. In combination with the crown C and side flues D D′, I also claim the flue-strips G G′ and abutments H H′, for the purpose specified.

In testimony of which invention I hereunto set my hand.

A. J. REDWAY.

Witnesses:

GEO. H. KNIGHT,

JAMES H. LAYMAN.